United States Patent
Kamata

(10) Patent No.: US 9,612,350 B2
(45) Date of Patent: Apr. 4, 2017

(54) CONTROLLED DAMPING GEOPHONE

(71) Applicant: Schlumberger Technology Corporation, Sugar Land, TX (US)

(72) Inventor: Masahiro Kamata, Kawasaki (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 907 days.

(21) Appl. No.: 13/858,935

(22) Filed: Apr. 8, 2013

(65) Prior Publication Data
US 2014/0301160 A1 Oct. 9, 2014

(51) Int. Cl.
*G01V 1/18* (2006.01)
*G01V 13/00* (2006.01)

(52) U.S. Cl.
CPC .............. *G01V 1/182* (2013.01); *G01V 13/00* (2013.01); *Y10T 29/49005* (2015.01)

(58) Field of Classification Search
CPC ................................ G01V 1/181; G01V 1/182
USPC .................................................. 367/182–184
See application file for complete search history.

(56) References Cited

U.S. PATENT DOCUMENTS

| | | | |
|---|---|---|---|
| 4,144,520 A | 3/1979 | McNeel | |
| 4,159,464 A | 6/1979 | Hall, Jr. | |
| 4,504,932 A | 3/1985 | Sundt | |
| 4,646,014 A * | 2/1987 | Eulenberg | 324/251 |
| 4,757,706 A * | 7/1988 | Doggett | 73/1.85 |
| 7,099,235 B2 | 8/2006 | Kamata | |
| 2009/0028375 A1 | 1/2009 | Richoux et al. | |
| 2011/0007608 A1 | 1/2011 | Woo | |

OTHER PUBLICATIONS

International search report and written opinion for the equivalent PCT patent application No. PCT/US2014/033373 issued on Aug. 20, 2014.

* cited by examiner

*Primary Examiner* — Ian J Lobo
(74) *Attorney, Agent, or Firm* — Trevor G. Grove

(57) ABSTRACT

Vibration transducers, sensors including the vibration transducers, and methods for manufacturing the same. The vibration transducer may include a magnet. The vibration transducer may include a bobbin disposed about the magnet. The vibration transducer may include a first coil disposed about the bobbin. The vibration transducer may include a controllable damping coil disposed about the bobbin. The first coil is movable relative to the magnet. The magnet is polarized with respect to the axis of the vibration transducer.

9 Claims, 14 Drawing Sheets

CONTROLLED DAMPING GEOPHONE

BACKGROUND

The present disclosure relates to geophone devices for sensing vibrations in earth formations, and may be applicable to other types of vibration transducers, either in sensing or transmitting operation. More specifically, the present disclosure relates to a damping controlled geophone.

In seismic exploration, vibrations in the earth resulting from a source of seismic energy may be sensed at discrete locations by sensors and the output of the sensors used to image underground structures, or to locate seismic events. The source of seismic energy can be natural, such as earthquakes and other tectonic activity, subsidence, volcanic activity or the like, or man-made such as acoustic noise from surface or underground operations, or from deliberate operation of seismic sources at the surface or underground. Seismic sensors fall into two categories: hydrophones that sense the pressure field resulting from a seismic source, or geophones that sense vibration arising from a seismic source.

An oscillatory geophone is shown in FIG. 1-1. The geophone 10 includes a housing 24, a top cap 27 and a bottom cap 28 that are affixed to the housing 24, a magnet 15 having a pair of pole pieces 16, 18 that are respectively affixed to the top and bottom caps 27, 28, a moving coil that includes two coil windings 12, 13 and a bobbin 14 with suspension springs 20, 22 as shown in FIG. 1-1. The magnet 15, along with its two pole pieces 16, 18, can move with the housing 24. Pole pieces 16, 18 and housing 24 are made of magnetically permeable material and form a magnetic flux 25 in which the moving coil is suspended. The caps 27, 28 are made of magnetically impermeable material. In this particular embodiment as shown, the coil windings 12, 13 are connected in series to form a continuous coil. The windings 12, 13 may be disposed about the bobbin 14 in opposite directions, so that the windings 12, 13 can generate voltage in a common direction. The windings 12, 13 of the moving coil are commonly mounted and move together. As illustrated, the magnetic flux 25 passes out one winding from inside to outside near the north of the magnet 15, and then out the other winding from outside to inside near the south of the magnet 15.

When the earth moves due to the seismic energy propagating either directly from the source or via an underground reflector, the geophone 10, which can be located at the earth's surface or on the wall of a borehole penetrating the earth, moves in the direction of the particle motion resulting from propagation of the energy. If the axis of the geophone 10 is aligned with the direction of motion, however, the coil windings 12, 13 mounted on the springs 20, 22 inside the geophone 10 stay in the same position causing relative motion of the moving coil with respect to the magnetic flux 25 that moves with the housing 24. When the moving coil moves in the magnetic field, a measurable voltage is induced in the moving coil, which is proportional to the velocity of the relative motion between the moving coil and the magnetic flux 25.

Variations of geophones are described in U.S. Pat. No. 7,099,235 to Kamata, U.S. Publication 2011/0007608 to Woo, and U.S. Pat. No. 4,159,464 to Hall.

SUMMARY

In at least one aspect, the disclosure relates to a vibration transducer with controlled damping. The vibration transducer may include a magnet. The vibration transducer may include a bobbin disposed about the magnet. The vibration transducer may include a first coil disposed about the bobbin. The vibration transducer may include a controllable damping coil disposed about the bobbin. The first coil is movable relative to the magnet. The magnet is polarized with respect to the axis of the vibration transducer.

In at least one aspect, the disclosure relates to a seismic sensor. The seismic sensor includes controlled damping. The seismic sensor may include a magnet. The seismic sensor may include a bobbin disposed about the magnet. The seismic sensor may include a first coil disposed about the bobbin. The seismic sensor may include a controllable damping coil disposed about the bobbin. The first coil is movable relative to the magnet. The magnet is polarized with respect to the axis of the seismic sensor. The seismic sensor may also include a sensor housing. The seismic sensor may also include at least one signal output connectable to a data processing system.

In at least one aspect, the disclosure relates to a method of manufacturing a vibration transducer. The method may include providing a housing having a magnet structure disposed in the housing, and a bobbin and moving coil disposed about the magnet structure and resiliently mounted relative to the housing and the magnet structure. The method may also include providing a damping coil disposed concentrically about the bobbin adjacent to the moving coil.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for a controlled damping geophone are described with reference to the following figures. Like numbers are used throughout the figures to reference like features and components.

FIG. 1-2 shows a schematic of displacement of the geophone of FIG. 1-1 while sensing;

FIG. 2 shows a plot of an amplitude response for a unit velocity against frequency in Hertz for the geophone of FIG. 1-1;

FIG. 7-1 shows a moving coil having an independent damping coil added to each end of a dual coil in an embodiment of the present disclosure;

FIG. 7-2 shows corresponding winding directions of the coils of the geophone of FIG. 7-1;

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

Currents can be induced in a geophone bobbin to dampen oscillating motion of the bobbin relative to the remainder of the geophone as the coils move in a magnetic field. Damping caused in the bobbin may be accounted for, and controlled, by implementing a short circuit damping coil and temperature insensitive wire, such as Constantan. The damping coil can be controlled to produce effective damping (e.g., approximately 70%) without an external shunt resistor. In an embodiment, the damping coil may be manufactured of Constantan wire to limit temperature dependency.

Figure 1:
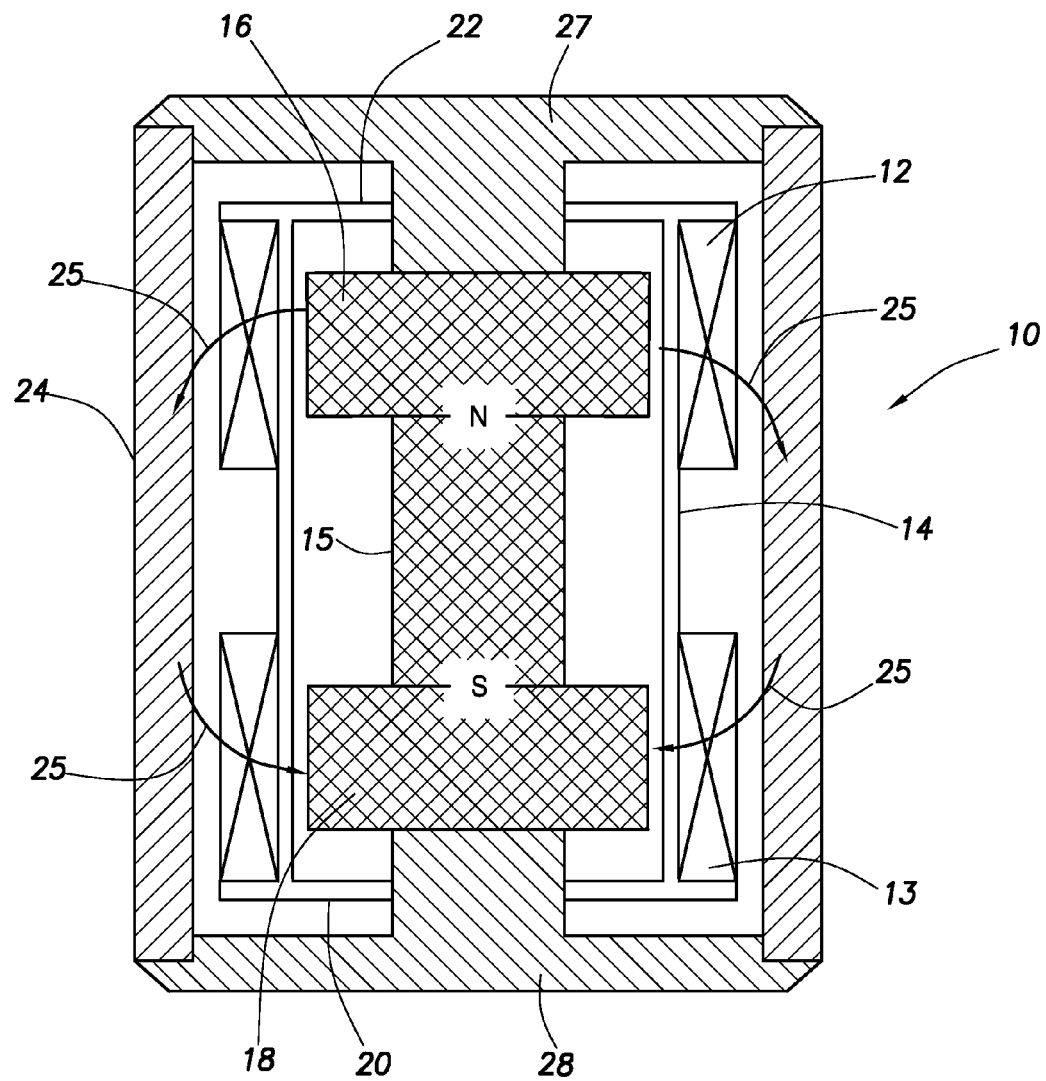
FIG. 1-1 is a cross-sectional view of a geophone.

Referring now to FIG. 1-1, a cross-section of a geophone 10 is shown. The geophone 10 includes a moving coil with windings 12, 13 mounted on a bobbin 14, a magnet 15, a pair of pole pieces 16, 18 with suspension springs 20, 22 and a housing 24 as shown in FIG. 1-1. The pole pieces 16, 18 and the housing 24 are made of magnetically permeable material and form a magnetic field in which the moving coil is suspended.

Figures 1, 2:
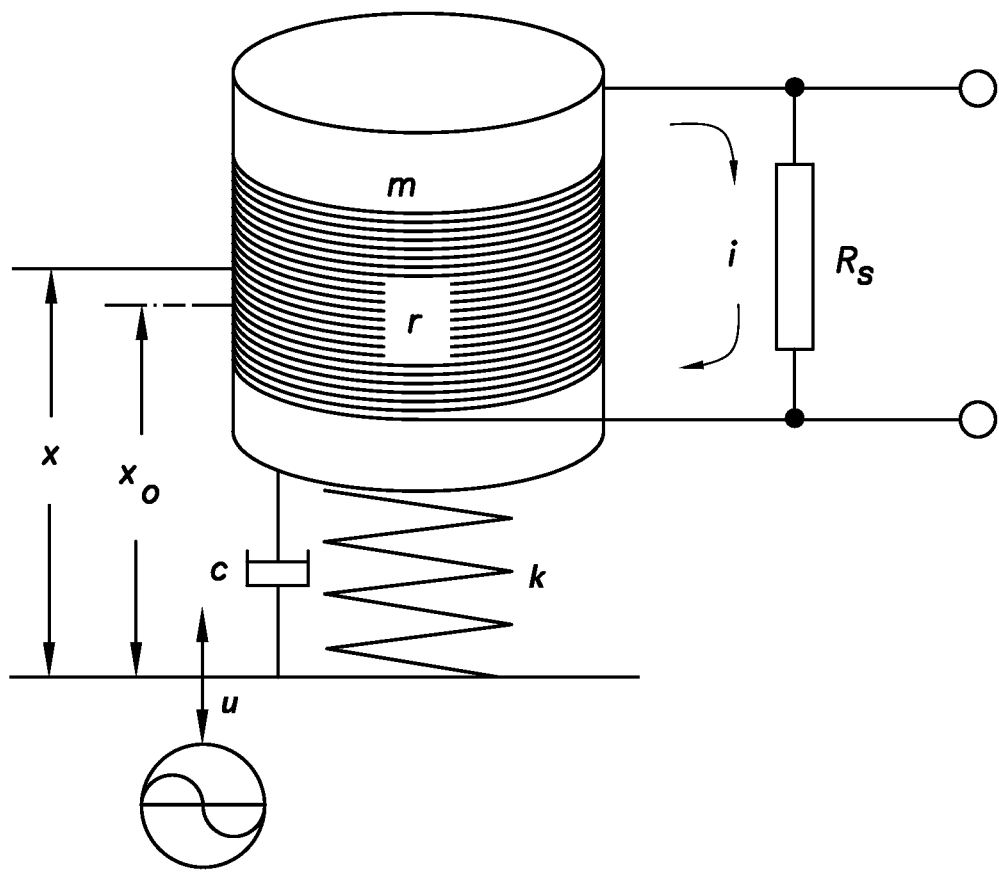
Figure 2:
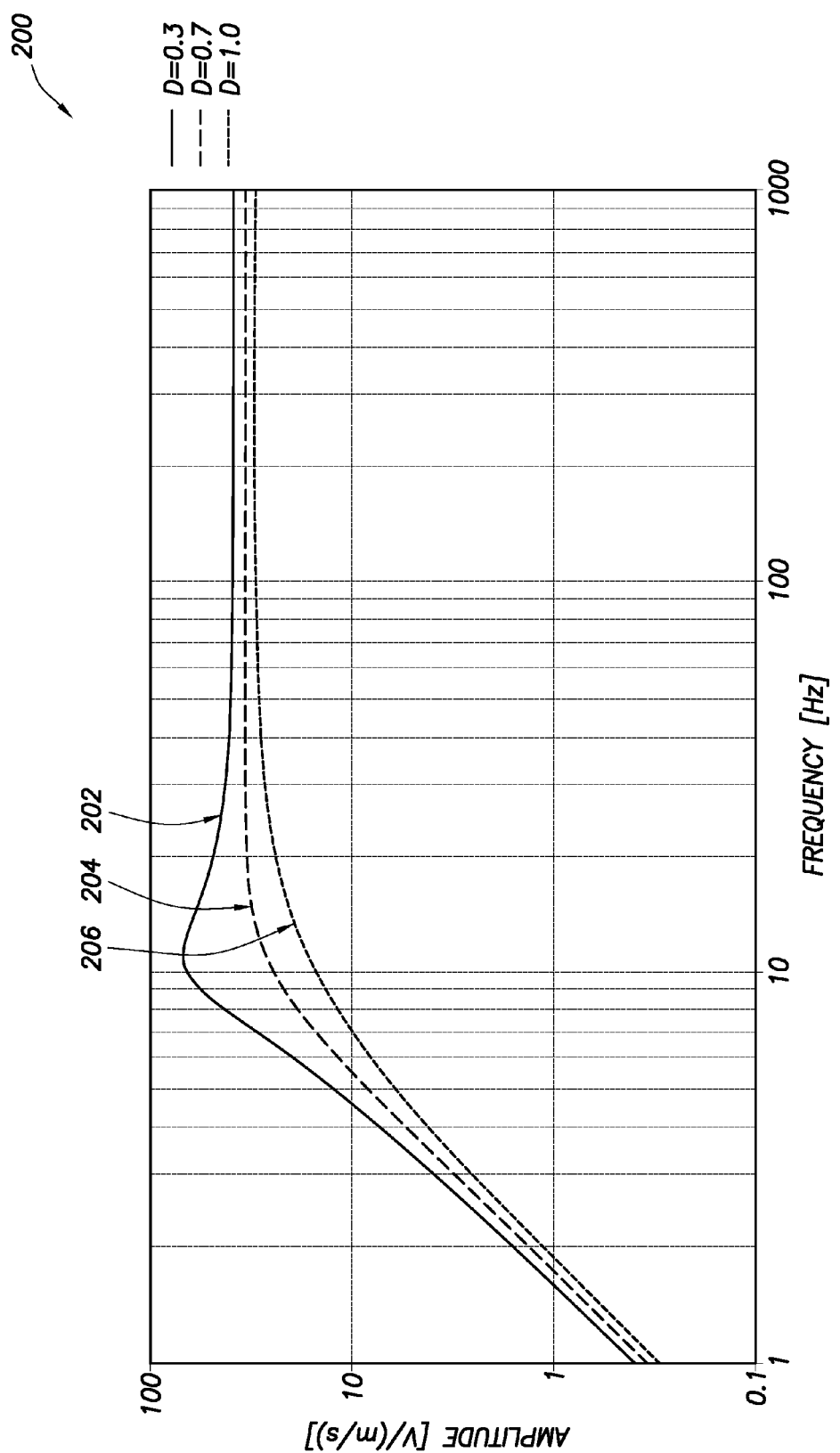

Referring now to FIG. 1-2, a schematic of the displacement of the geophone of FIG. 1-1 while sensing is shown. $R_s$ represents an external shunt resistor, and r represents a DC resistance of the coil, as above. The moving coil has a moving mass m and its neutral position relative to the housing is $x_0$. The displacement of the ground motion is u, which can be measured with reference to the neutral position $x_0$. x is the displacement of the coil while sensing, which can also be measured with reference to the neutral position $x_0$. The output is connected to the external shunt resistor $R_s$ to adjust the total damping factor D. The external shunt resistor $R_s$ may be varied to control the damping of the coil movement.

As the coil moves in the magnetic flux 25, the coil generates signal $e_g$, which can be defined by:

$$e_g = Blv \qquad \text{Equation 1}$$

where B represents the magnetic flux density, l represents the length of the coil, v represents the velocity of the moving coil relative to the magnetic field, and u represents the displacement of the ground motion. The product, Bl, represents the conversion factor of a geophone from velocity of ground motion to the electric signal, $e_g$, and can be defined as open circuit sensitivity, $S_0$.

The current i flowing out of the coil and returned through the shunt resistor $R_s$ can be defined by:

$$i = \frac{e_g}{r + R_s} \qquad \text{Equation 2}$$

Current in the coil causes a force f to limit the motion of the coil, which can be defined by:

$$f = S_0 i \qquad \text{Equation 3}$$

A spring force acting on the moving mass m is proportional to the difference between the coil displacement x and the ground displacement u and can be defined by:

$$-k(x-u) \qquad \text{Equation 4}$$

where k is the spring constant.

A damping force is related to the velocity of the coil in the magnetic field and can be defined by:

$$-c\frac{d(x-u)}{dt} \qquad \text{Equation 5}$$

where c is the friction factor proportional to the velocity, t is time. One cause of damping may be the current flowing in the metallic bobbin, as friction of the moving mass in the air and the loss in the spring can be negligibly small.

Motion of the moving coil can be described in an equation of motion:

$$m\frac{d^2x}{dt^2} = -c\frac{d(x-u)}{dt} - k(x-u) - S_0 i \qquad \text{Equation 6}$$

From Equations 1 and 2, current can be defined as:

$$i = \frac{e_g}{r + R_s} = \frac{S_0}{r + R_s}\frac{d\xi}{dt} \qquad \text{Equation 7}$$

A relative position of the moving coil to the ground motion in the housing can be defined as:

$$\xi = x - u \qquad \text{Equation 8}$$

A natural frequency $\omega_0$ and a controlled damping $D_0$ can be defined as:

$$\omega_0 = \sqrt{\frac{k}{m}} \qquad \text{Equation 9}$$

$$D_0 = \frac{c}{2m\omega_0} \qquad \text{Equation 10}$$

Equation 6 can be rewritten as $$\frac{d^2\xi}{dt^2} + 2\omega_0 D_0 \frac{d\xi}{dt} + \omega_0^2 \xi = -\frac{d^2u}{dt^2} - \frac{S_0^2}{m(r+R_s)}\frac{d\xi}{dt} \qquad \text{Equation 11}$$

The total damping D can be defined as:

$$D = D_0 + \frac{S_0^2}{2m\omega_0(r + R_s)} \quad \text{Equation 12}$$

The equation of motion for the moving mass can be rewritten as:

$$\frac{d^2\xi}{dt^2} + 2\omega_0 D \frac{d\xi}{dt} + \omega_0^2 \xi = -\frac{d^2 u}{dt^2} \quad \text{Equation 13}$$

Assuming that ground motion u may be governed by:

$$u = a\sin(\omega t) \quad \text{Equation 14}$$

where a denotes the amplitude and ω is the angular frequency of the ground motion.
Then:

$$\xi = \frac{a\left(\frac{\omega}{\omega_0}\right)^2}{\sqrt{\left(1 - \frac{\omega^2}{\omega_0^2}\right)^2 + \left(2D\frac{\omega}{\omega_0}\right)^2}} \sin(\omega t - \varphi) \quad \text{Equation 15}$$

where the phase delay φ of the coil motion is $$\tan(\varphi) = \frac{2D\frac{\omega}{\omega_0}}{1 - \frac{\omega^2}{\omega_0^2}} \quad \text{Equation 16}$$

The electric signals can be governed by:

$$e_g = \frac{a\omega S_0 \left(\frac{\omega}{\omega_0}\right)^2}{\sqrt{\left(1 - \frac{\omega^2}{\omega_0^2}\right)^2 + \left(2D\frac{\omega}{\omega_0}\right)^2}} \cos(\omega t - \varphi) \quad \text{Equation 17}$$

In a first example, a geophone has response parameters shown in Table 1.

TABLE 1

| | |
|---|---|
| $f_0$ [Hz] | 10 |
| $S_0$ [V/(m/s)] | 40 |
| $D_0$ [—] | 0.2 |
| r [ohm] | 400 |
| m [kg] | 0.01 |

The total damping factor D is adjusted by shunt resistors $R_s$ to adjust Case 1 (D=0.3), Case 2 (D=0.7) and Case 3 (D=1.0) according to Equation 12 as shown in Table 2.

TABLE 2

| | Case 1 | Case 2 | Case 3 |
|---|---|---|---|
| $R_s$ [ohm] | 12286 | 2145 | 1192 |
| D [—] | 0.30 | 0.70 | 1.00 |
| S [V/(m/s)] | 38.7 | 33.7 | 29.9 |

The output signal can be reduced by the shunt resistance and coil resistance, and the overall sensitivity S can be governed by:

$$S = S_0 \frac{R_s}{r + R_s} \quad \text{Equation 18}$$

The amplitude response of the geophone with the response parameters shown in Table 1 for unit velocity against frequency in Hertz is calculated using Equation 17 for different cases of shunt resistor shown in Table 2. The plot 200 in FIG. 2 shows the geophone amplitude response (measured in V/(m/s)) over a plurality of frequencies (measured in Hz). The total damping factor is 0.3 for the frequency response line 202, 0.7 for the frequency response line 204, and 1.0 for the frequency response line 206, showing a suppression of resonance at the natural frequency via the shunt resistor.

Figure 3:
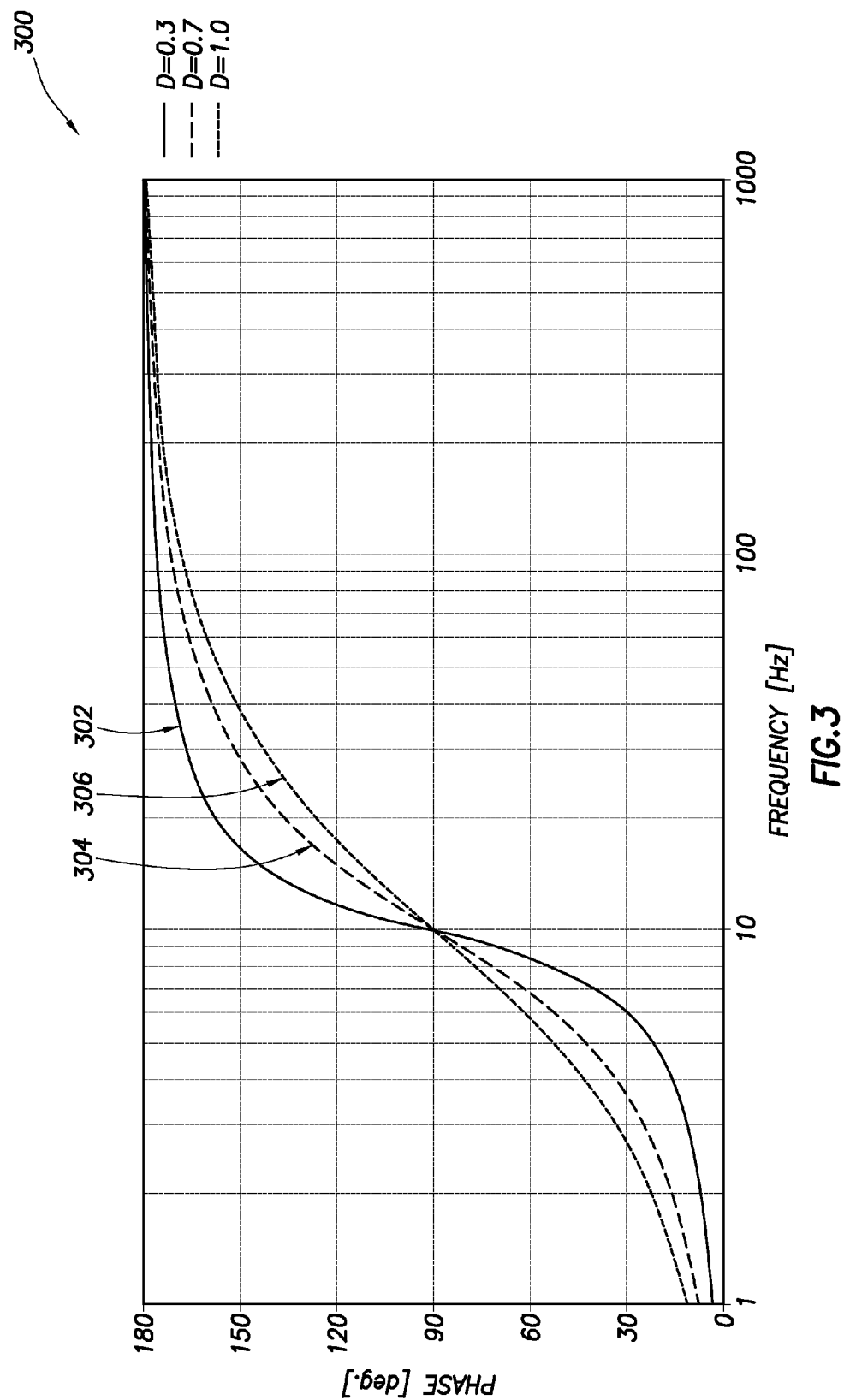
FIG. 3 shows a plot of a phase response in degrees against frequency in Hertz for the geophone of FIG. 1-1.

The phase response 300 resulting from Equation 16 is shown in FIG. 3 for Case 1, Case 2, and Case 3, plotting phase in degrees against frequency in Hertz. As in FIG. 2, for the three responses plotted, the damping factor is 0.3 for the frequency response line 302, 0.7 for the frequency response line 304, and 1.0 for the frequency response line 306.

In an example embodiment, the coil resistance r is a function of temperature. Typically the coil can be made of copper magnetic wire and the temperature dependency is found in an empirical relation as:

$$r = r_0\{1 + 0.00393(T - T_0)\}$$

where T is the operating temperature, $T_0$ is the room temperature, typically 20 degrees Celsius, and $r_0$ is the resistance at the room temperature.

Figure 4:
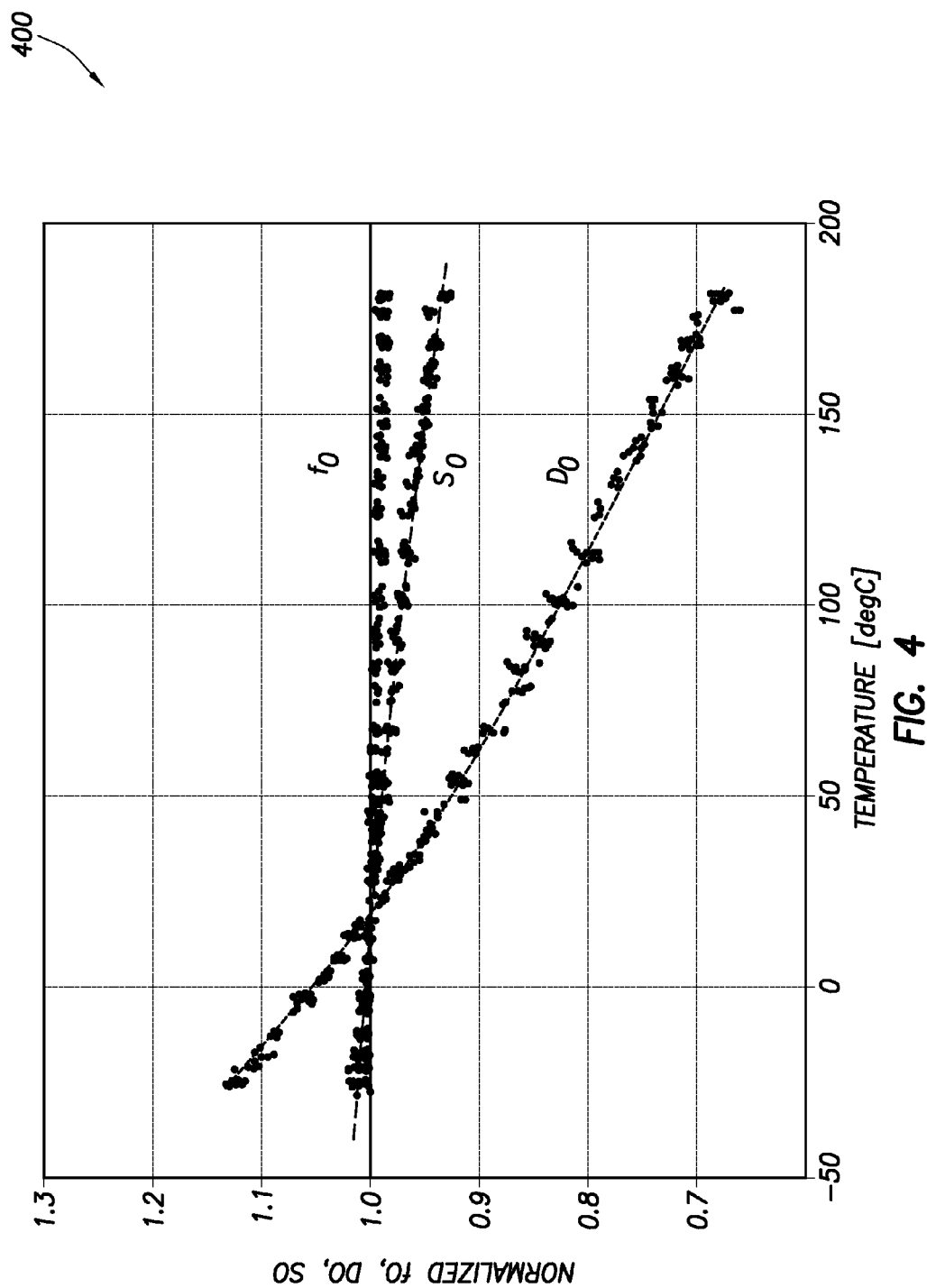
FIG. 4 shows a plot of natural frequency $f_0$, open circuit sensitivity $S_0$, and open circuit damping $D_0$, normalized at 20 degrees, versus temperature in degrees Celsius for the geophone of FIG. 1-1.

The natural frequency $f_0$, open circuit damping $D_0$, and open circuit sensitivity $S_0$ may change with temperature. FIG. 4 is a plot 400 of natural frequency $f_0$, open circuit sensitivity $S_0$, and open circuit damping $D_0$, versus temperature in degrees Celsius. The parameters are normalized by the values at 20 degrees Celsius. As can be seen in FIG. 4, the natural frequency, $f_0$ changes slightly with temperature due to the change in the Young's modulus of the spring material. The open circuit sensitivity $S_0$ changes due to the change of the demagnetizing curve of the permanent magnet. The open circuit damping $D_0$ changes with temperature. The open circuit damping is reduced by about 30% at 175 degrees Celsius. This is due to the increase of resistance of the bobbing and the reduction of the open circuit sensitivity.

For an example geophone with response parameters: $f_0$=15 Hz; $S_0$=52; $D_0$=0.57; r=2400 ohm; m=0.0078 kg; the total damping is about 70% with $R_s$=11672 ohm. The controlled damping is reduced by about 30% while the reduction of the open circuit sensitivity is about 5%. The coil resistance increases by about 61% at 175 degrees Celsius. Assume that the shunt resistance does not change with temperature, then the total damping is reduced by about 28% at 175 degrees Celsius by using Equation 12 with the temperature dependencies shown in FIG. 4. From Equation 18, the output sensitivity with the shunt resistor is reduced by about 14%. Table 3 summarizes the response of the geophone at 20 degrees Celsius and at 175 degrees Celsius.

TABLE 3

| | T [degC.] | |
|---|---|---|
| | 20 | 175 |
| $f_0$ [Hz] | 15 | 15 |
| $S_0$ [V/(m/s)] | 52 | 49.4 |
| $D_0$ [—] | 0.57 | 0.399 |
| m [kg] | 0.0078 | 0.0078 |
| r [ohm] | 2400 | 3862 |
| $R_s$ [ohm] | 11672 | 11672 |
| D [—] | 0.70 | 0.51 |
| S [V/(m/s)] | 43.1 | 37.1 |

Figure 5:
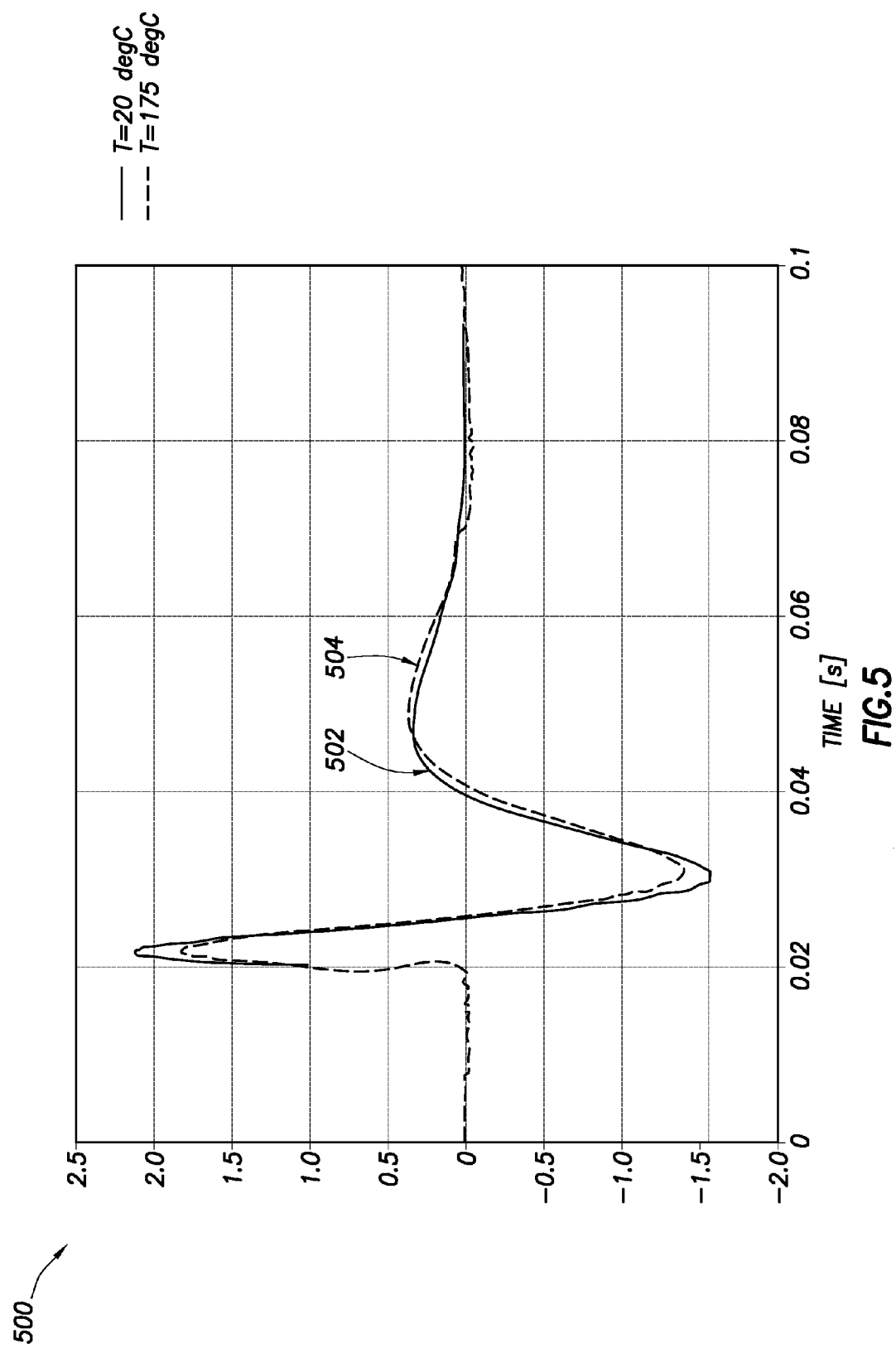
FIG. 5 shows a plot of geophone response over time for different temperatures for the geophone of FIG. 1-1.

FIG. 5 shows a plot 500 for simulated results of time responses of the geophone described above for temperature at 20 degrees Celsius and at 175 degrees Celsius. The input is an impulse that is band limited between 3 Hz and 60 Hz. Line 502 is the time response of the geophone at 20 degrees Celsius and line 504 is at 175 degrees Celsius. The amplitude of the response at 175 degrees Celsius is reduced and ringing is longer compared to the response at 20 degrees Celsius.

Figure 6:
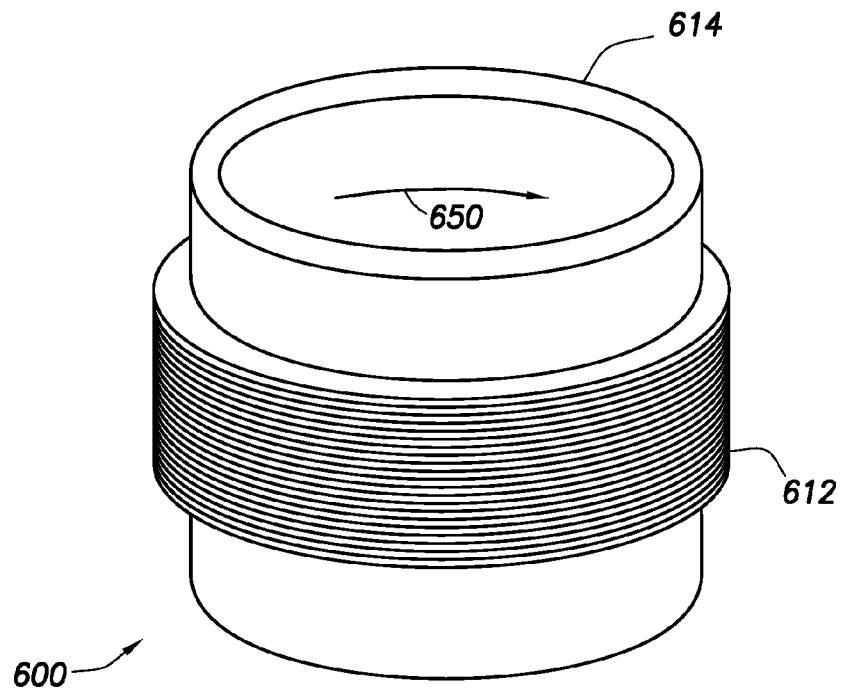
FIG. 6 shows side view of a current flow in a metallic bobbin implemented in a geophone.

The resistance of the bobbin may be taken into account in order to control damping. The magnet wire is wound on a metallic bobbin 614 as shown in FIG. 6, illustrating a coil wrapped bobbin 600. As shown in FIG. 6, the coil 612 is wound concentrically around the outer surface of the bobbin 614, such that the coil 612 moves with the bobbin 614 in the magnetic flux field, relative to the housing (not shown). Current $i_b$ 650 is induced in the bobbin 614, and in turn in the coil 612, when the coil 612 moves in the magnetic flux field. The resistance of the bobbin 614, $r_b$, is $$r_b = \rho \frac{2\pi d_b}{H\tau} \qquad \text{Equation 19}$$

where ρ represents specific electrical resistance; H represents the height of the bobbin 614; τ represents the thickness of the bobbin 614; $d_b$ represents the diameter of the bobbin 614.

The equation of motion (of the bobbin 614 and the moving coil 612) can be rewritten to include the damping caused in the bobbin 614, accordingly:

$$\frac{d^2\xi}{dt^2} + 2\omega_0 D \frac{d\xi}{dt} + \omega_0^2 \xi = -\frac{d^2u}{dt^2} - \frac{S_0^2}{mr_b}\frac{d^2\xi}{dt^2} - \frac{S_0^2}{m(r+R_s)}\frac{d^2\xi}{dt^2} \qquad \text{Equation 20}$$

where $D_r$ is the damping unrelated to the current in the bobbin 614, such as the friction in surrounding air and/or the friction in the spring material. The controlled damping in turn, can take the form:

$$D_0 = D_r + \frac{S_0^2}{2m\omega_0 r_b} \qquad \text{Equation 21}$$

Then the total damping can be governed by:

$$D = D_r + \frac{S_0^2}{2m\omega_0 r_b} + \frac{S_0^2}{2m\omega_0(r+R_s)} \qquad \text{Equation 22}$$

In comparison, a controllable damping coil added to a geophone may provide controlled damping without using the bobbin as the element to cause the damping, and thus, without an external shunt resistor. In an embodiment, the damping coil may be made of Constantan wire to limit the temperature dependency.

Figures 1, 7:
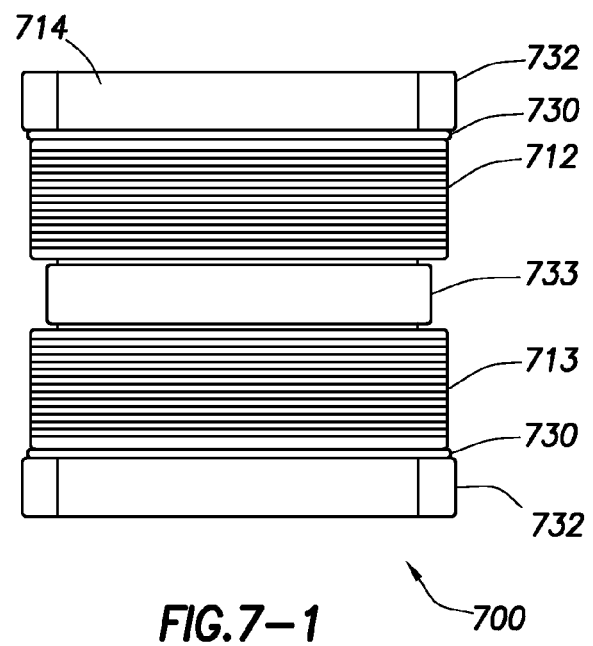
Figures 2, 7:
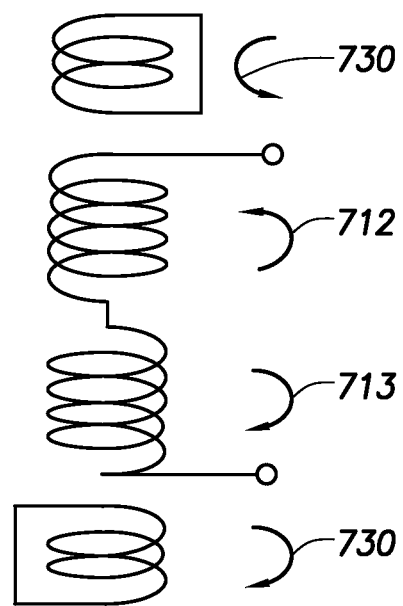

FIG. 7-1 shows a side view schematic of a dual coil geophone 700 having a damping coil added to each end of the coils. Underlying the geophone components, a bobbin (shown in shadow) is provided, about which additional geophone materials are disposed. The bobbin 714 may be made of various materials, including conductive metal or insulating plastic. A pair of coil windings 712, 713 is disposed concentrically about the bobbin 714, spaced apart from one another by a spacer 733. The spacer 733 may be made of, for example, an insulating material. At opposing ends of the geophone 700, a damping coil 730 is added to the bobbin 714 on the upper and lower ends of the moving coils 712, 713, respectively, and insulation rings 732 cap either end of the geophone 700 adjacent to each damping coil 730. FIG. 7-2 shows the relative winding directions of the moving coils 712, 713, and the damping coils 730.

Figure 8:
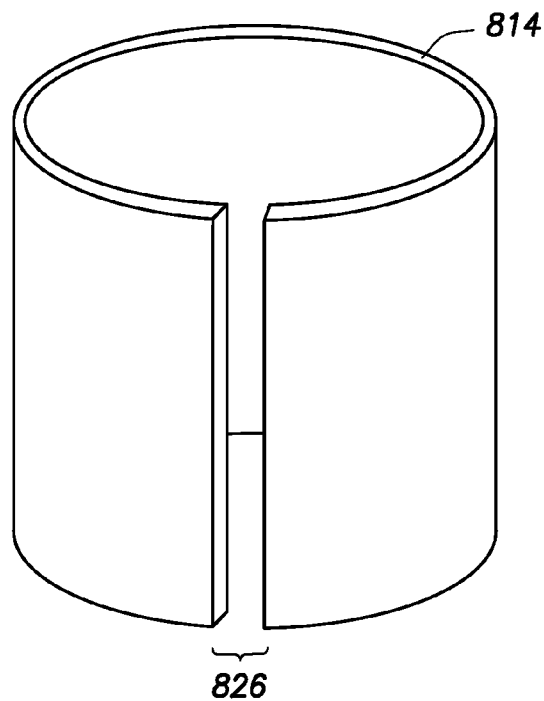
FIG. 8 shows an embodiment of a metallic slotted bobbin implemented in a geophone.

Various aspects of the bobbin and/or the damping coil may be designed to achieve particular results. For example, the thickness of the bobbin may be reduced by high precision machining, but there may be a limit to the effect of thickness. In an embodiment, the bobbin, when manufactured of a conductive metal, may be slotted as shown in FIG. 8 to stop current flowing in the slotted bobbin 814, as described in U.S. Pat. No. 7,099,235, commonly assigned with the present disclosure.

In an embodiment, a sheet metal may be employed to manufacture the bobbin, as described in U.S. Pat. No. 7,099,235. In an embodiment, the bobbin is formed from a simple tube of suitable thickness and material. For example, a plastic tube might be 0.15 mm thick and have a mass of about 2 g, which can be extruded or formed in any suitable manner. Optionally, the bobbin 814 may be formed from a flat sheet into a tubular shape with a slot 826 down one side (FIG. 8), in which case aluminum having a thickness of 0.1 mm might be used. When the bobbin 814 is a continuous metal tube, currents can be set up which damp the motion of the moving coil. If the tube is incomplete (as shown in FIG. 8), currents may be prevented.

Figure 9:
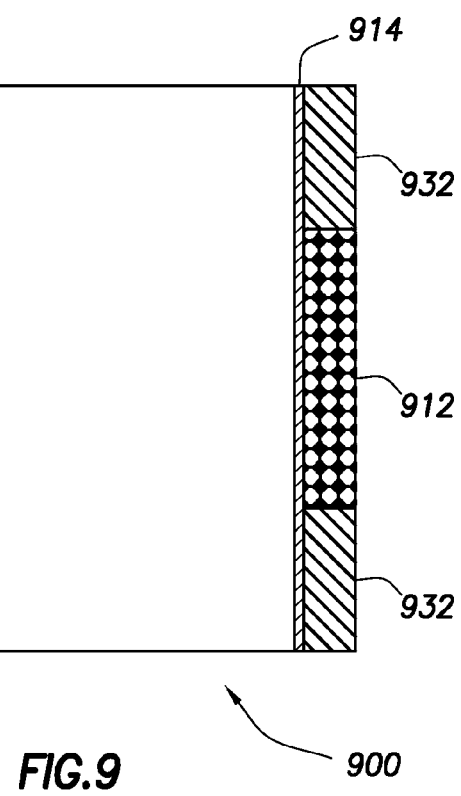
FIG. 9 shows an embodiment of a slotted bobbin reinforced with insulation rings.

In FIG. 9, an embodiment of the geophone 900 includes the moving coil 912 shown disposed and wrapped concentrically about the bobbin 914. An insulation ring 932 is additionally wrapped or placed over the end of the bobbin 914 so as to be positioned concentrically about the bobbin 914 at either end such that the moving coil 912 is layered between rings of insulation 932 at either end.

Figure 10:
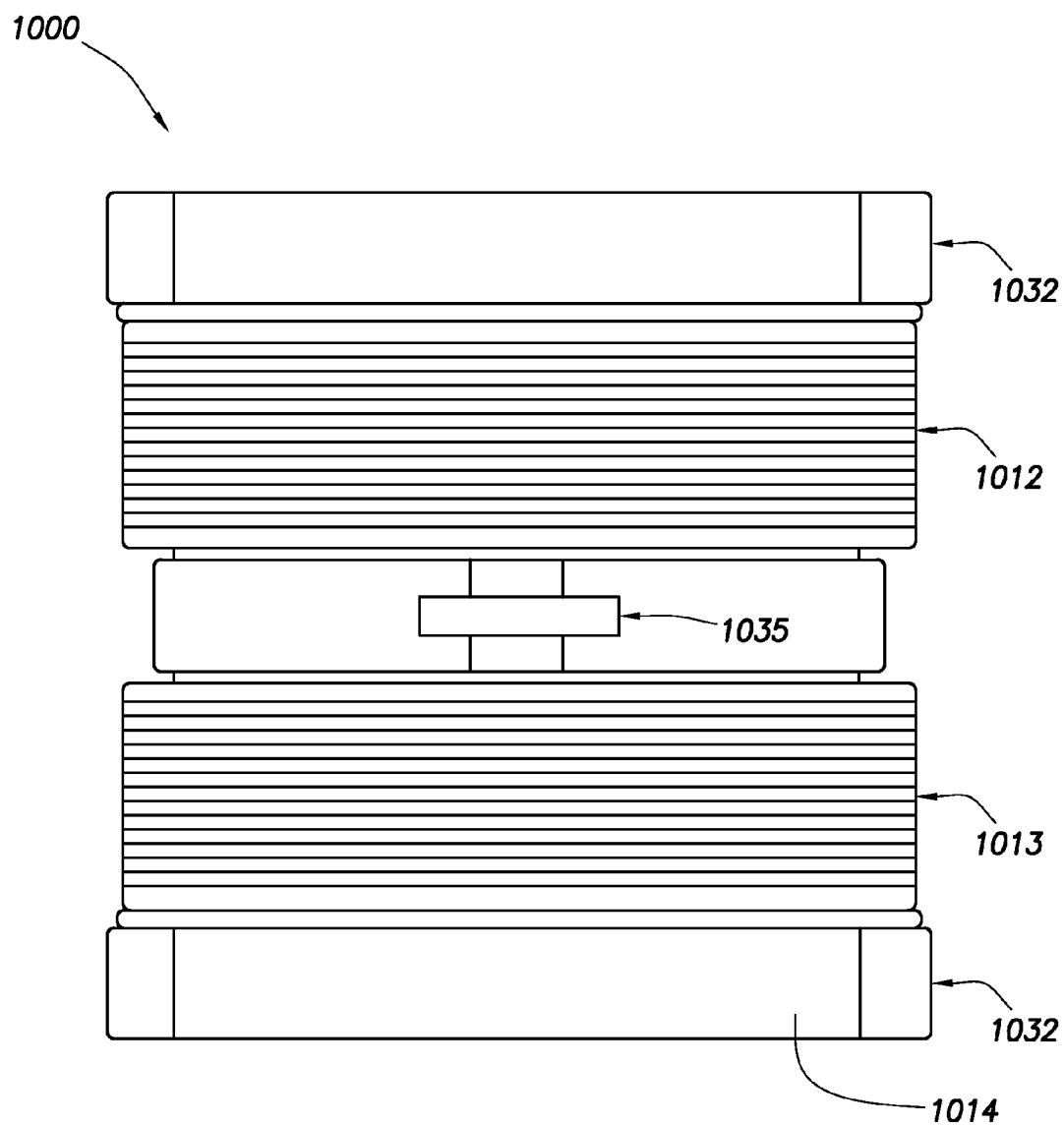
FIG. 10 shows an embodiment of a slotted bobbin shorted with a chip resistor.

In an embodiment, insulation material may be cladded to the bobbin as shown in FIG. 10. In FIG. 10, an embodiment of the geophone 1000 includes the moving coils 1012, 1013 shown disposed and wrapped concentrically about the bobbin 1014 (shown in shadow). Insulation 1032 is cladded in a layer directly onto the outer surface of the bobbin 1014 at either end such that the moving coils 1012, 1013 are layered between insulation 1032 at either end.

In the case that optimal damping resistance is high relative to the resistance of the bobbin, the damping resistance may dominate the total resistance, so the temperature dependency can be controlled by a chip resistor. As seen in FIG. 10, a slotted bobbin 1014 may underlay additional geophone components. A pair of moving coils 1012, 1013 is disposed and wrapped concentrically about the slotted bobbin 1014, spaced apart by an open space lacking insulation or slot. In the open space separating the pair of moving coils 1012, 1013, a damping resistance 1035, such as a chip resistor, may be employed. Capping either end of the bobbin 1014, insulation 1032 (disposed as a ring or cladded directly to the bobbin 1014) is provided.

Figure 11:
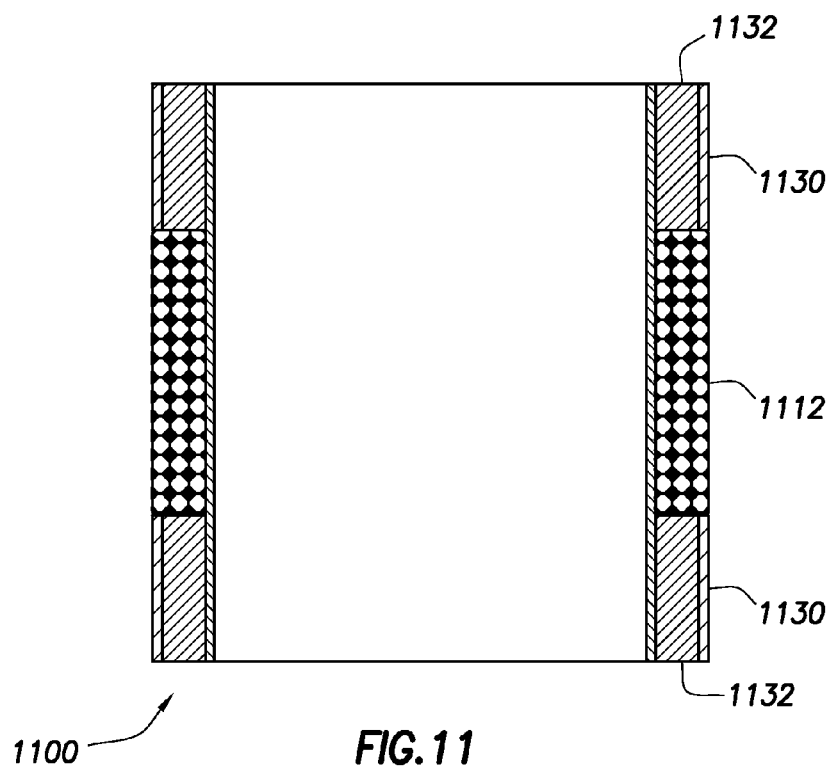
FIG. 11 shows a cross-section of a geophone having metal deposition on a plurality of independent insulation rings on a slotted metallic bobbin.

In still another embodiment, an embodiment of the geophone 1100 includes one or more independent damping coil(s), as shown in FIG. 11. In an embodiment, each independent damping coil 1130 can be a one-turn coil of metal deposited onto the insulation ring 1132, at either end of the moving coil 1112. In the embodiment of FIG. 11, a temperature insensitive wire material may be used for the one-turn damping coil 1130, such as Constantan whose resistance is constant across a wide range of temperatures to reduce temperature dependence. The damping coil 1130 may be formed of a metal added to the outside of insulation 1132 (in ring form, or cladded directly to the bobbin as described above), forming a one-turn coil disposed on top of insulation 1032 at either end of the bobbin.

The resistance of the bobbin $r_b$ may be calculated as:

$$r_b = \rho \frac{2\pi d_b n}{\pi d_w^2/4} = \rho \frac{8\pi d_b n}{\pi d_w^2} \quad \text{Equation 23}$$

where $d_w$ is the wire diameter of the damping coil, $d_b$ is the diameter of the bobbin, $\rho$ is the resistivity of the bobbin, and n is the number of turns of the damping coil.

By implementing a damping coil with an open circuit response when output terminals are open, the amount of damping and temperature coefficient can be controlled. In turn, the controlled damping may be optimized to a particular degree of damping, for example, to about 70%, as would be achieved in a conventional geophone using external shunt resistor. By using temperature insensitive wire, such as Constantan, the temperature effects on the controlled damping can be reduced at high temperatures (for example, about 175 degrees Celsius and higher). Demagnetization of the magnet may affect the efficacy of damping, but to a lesser degree than in conventional geophones.

Figure 12:
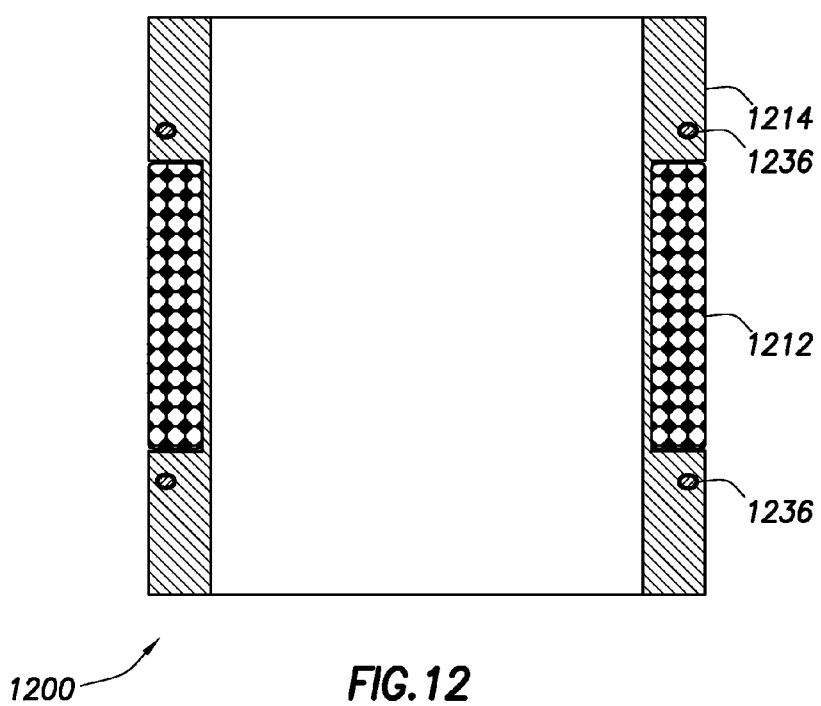
FIG. 12 shows a cross-section of a geophone having a damping coil embedded in a plastic bobbin.

Alternatively, in an embodiment of geophone 1200, a damping coil 1236 can also be embedded in the material of a plastic bobbin 1214 as shown in FIG. 12. In the embodiment of FIG. 12, the bobbin 1214 is made of an insulating plastic material, with a recess into which the moving coil 1212 is wound concentrically about the bobbin 1214. In a groove (or second recess) disposed about the bobbin 1214 in the insulating plastic both above and below the recess in which the moving coil 1212 is disposed, a metal material may be disposed, thereby forming the damping coil 1236 embedded in the plastic bobbin 1214 material.

Figure 13:
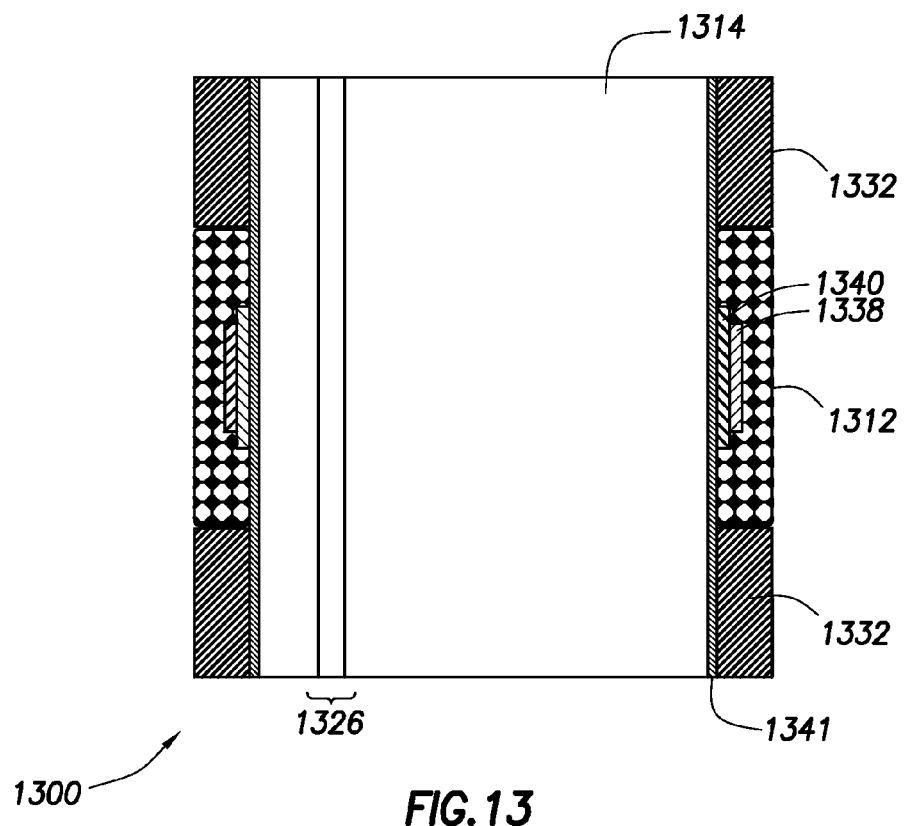
FIG. 13 shows an embodiment for damping coil as a thin metallic foil around a slotted bobbin.
Figure 14:
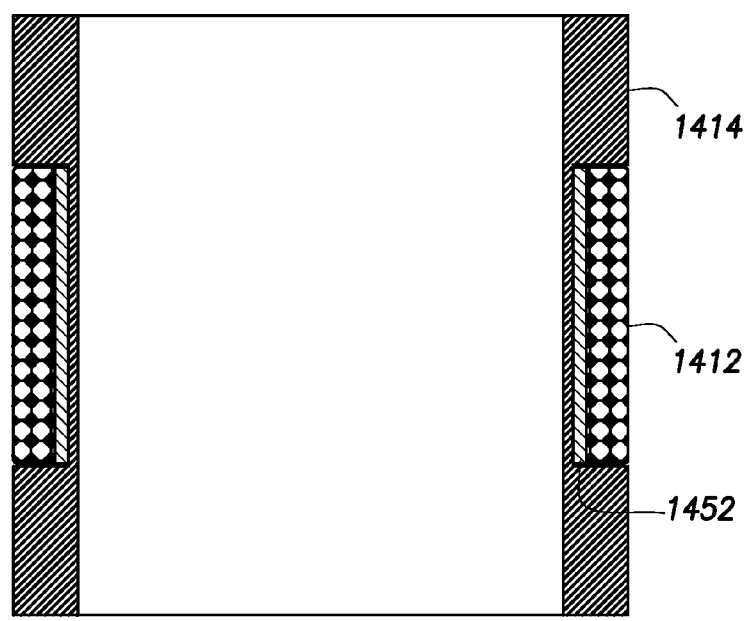
FIG. 14 shows an embodiment for damping coil as metal disposed on a plastic bobbin under a geophone coil.

Alternatively, in an embodiment of geophone 1300, an equivalent effect may be achieved by wrapping thin metallic foil as the damping coil 1338 around a slotted bobbin 1314 after providing insulation 1340 on the bobbin 1314, such as insulation sheet or an anodic oxidation coating on the bobbin 1314 as shown in FIG. 13. The insulation 1340 and the conductive foil damping coil 1338 can be sufficiently thin as to not reduce the space allowed for the sensing moving coil 1312. As shown in FIG. 13, a slotted bobbin (as shown in FIG. 8) may have a thin layer of insulation 1341, added by cladding, layering, or sputtering onto the bobbin 1314. On top of the conductive thin layer, the moving coil(s) 1312 may be concentrically wound about the bobbin as described previously. Insulation 1332 in the form of material disposed to the bobbin 1314 by cladding, or slipped over the ends of the bobbin in ring-form, spans the outer ends of the bobbin around the moving coil(s). The same effect can be obtained by depositing metal as the damping coil 1452 on to a non-conductive plastic bobbin 1414 underneath the sensing moving coil 1412, as shown in the geophone 1400 of FIG. 14.

Figure 15:
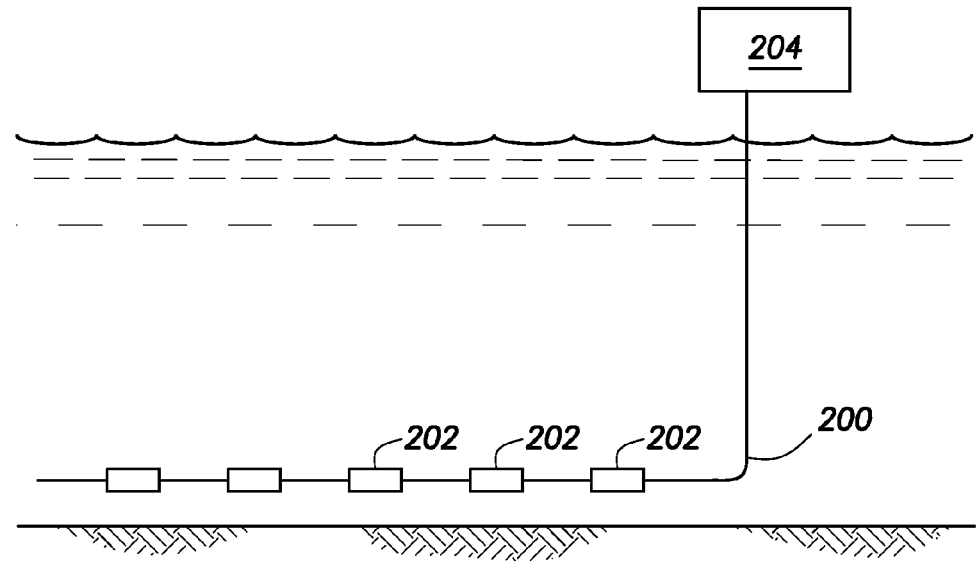
FIG. 15 shows a geophone in accordance with the present disclosure disposed on a sea bed cable.
Figure 16:
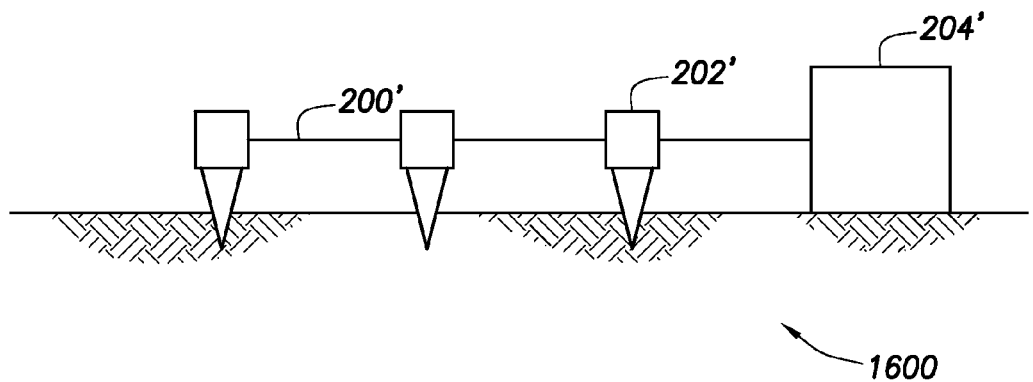
FIG. 16 shows a geophone in accordance with the present disclosure disposed on a land cable.

Geophones of the present disclosure find particular applications in seismic surveying equipment. FIG. 15 shows a marine seismic survey 1500 having a sea bed cable 200 which includes a number of geophone packages 202 spaced at regular intervals and connected through the cable 200 to processing equipment 204. FIG. 16 shows a land seismic survey 1600 having a land cable 200' which has a similar configuration as the sea bed cable with geophones 202' spaced apart and connected to processing equipment 204'.

Figure 17:
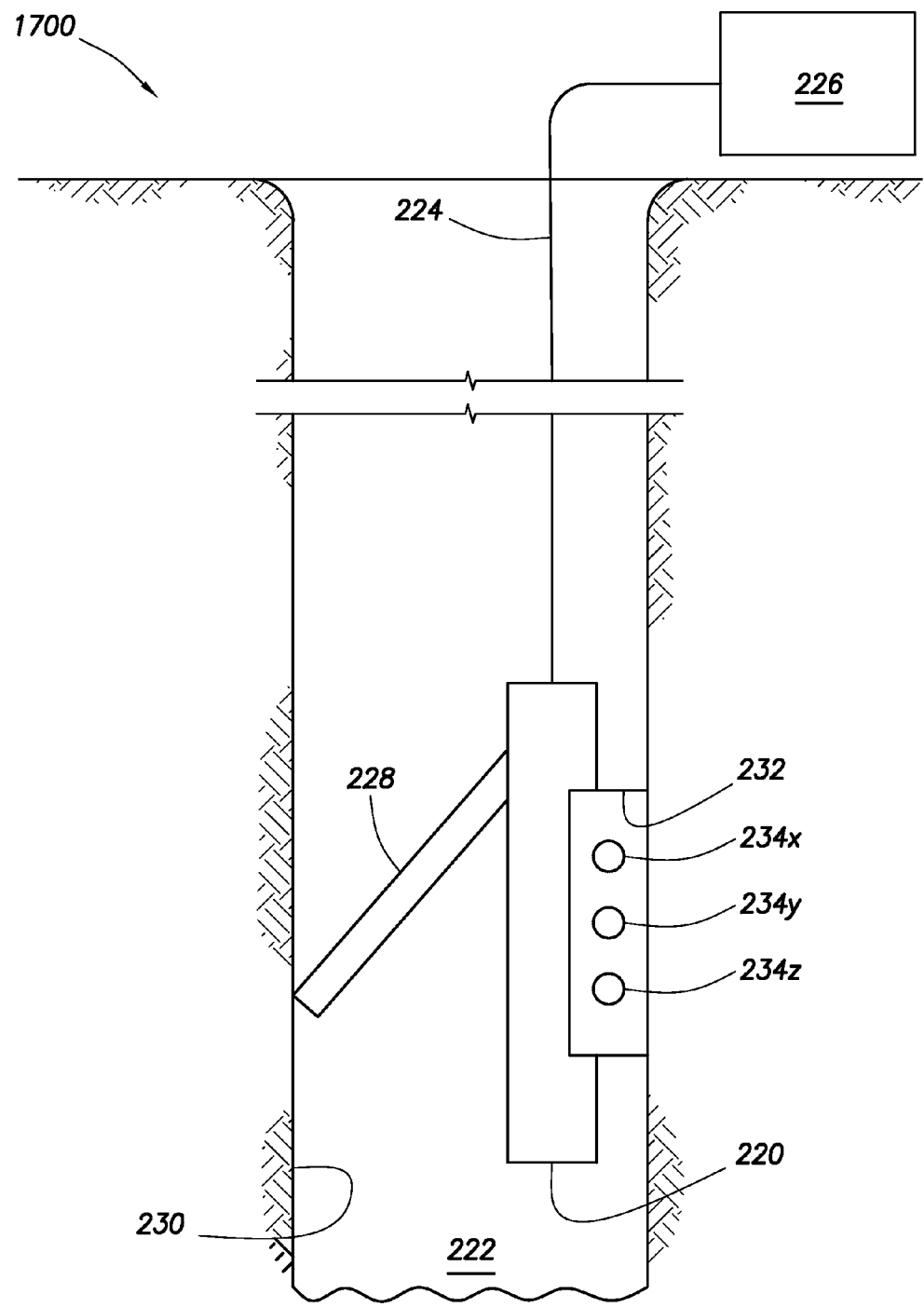
FIG. 17 shows geophones in accordance with the present disclosure disposed on a borehole tool.

FIG. 17 shows a borehole seismic survey 1700 having a downhole tool comprising a tool body 220 which can be lowered into a borehole 222 on a wireline cable 224 connected to surface processing equipment 226. The tool body 220 includes an operable arm 228 which can be caused to bear against the borehole wall 230, and a sensor package 232 which is forced against the borehole wall 230 due to the action of the arm 228. The sensor package 232 contains three orthogonally oriented geophones 234$x$, 234$y$, 234$z$ (x, y, z directions) which can receive seismic signals and pass data back to the surface via the wireline cable 224.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A vibration transducer with controlled damping, comprising:
   a magnet;
   a bobbin assembly disposed about the magnet, comprising:
      a slotted bobbin comprising a chip resistor electrically coupling opposing sides of a slot;
      a coil mounted on the slotted bobbin and magnetically interacting with the magnet;
      a controllable damping coil mounted on the slotted bobbin and magnetically interacting with the magnet;
   wherein the magnet is polarized with respect to the axis of the vibration transducer; and
   wherein the chip resistor adjusts damping resistance provided by the slotted bobbin.

2. The vibration transducer according to claim 1, wherein the controllable damping coil comprises a temperature insensitive material.

3. The vibration transducer according to claim 2, wherein the controllable damping coil comprises a temperature insensitive Constantan wire.

4. The vibration transducer according to claim 1, wherein the bobbin assembly further comprises one or more insulation rings disposed about the slotted bobbin; wherein and the controllable damping coil is disposed on the one or more insulation rings.

5. The vibration transducer according to claim 1, wherein the bobbin assembly further comprises:
one or more insulation rings disposed about the slotted bobbin; and
an insulating spacer;
wherein the controllable damping coil is disposed between the one or more insulation rings and the insulating spacer.

6. A
a vibration transducer comprising:
a magnet;
a bobbin assembly disposed about the magnet comprising:
a slotted bobbin comprising a chip resistor electrically coupling opposing sides of a slot;
a coil mounted on the slotted bobbin and magnetically interacting with the magnet; and
wherein the magnet is polarized with respect to the axis of the vibration transducer; and
wherein the chip resistor adjusts damping resistance provided by the slotted bobbin.

7. The vibration transducer according to claim 6, wherein the damping resistance provided by the slotted bobbin is adjusted as a function of temperature.

8. A method of manufacturing a vibration transducer comprising:
providing a housing having a magnet structure disposed therein, and a bobbin assembly disposed about the magnet structure and resiliently mounted relative to the housing and the magnet structure;
wherein the bobbin assembly further comprises:
a slotted bobbin comprising a chip resistor electrically coupling opposing sides of a slot;
a coil mounted on the slotted bobbin and magnetically interacting with the magnet structure; and
wherein the chip resistor adjusts damping resistance provided by the slotted bobbin.

9. The method according to claim 8, further comprising forming the slotted bobbin of the bobbin assembly from a flat sheet into a tubular shape having the slot along the length thereof and mounting the coil thereto.

* * * * *